United States Patent
Ramamoorthy

(10) Patent No.: US 10,547,236 B1
(45) Date of Patent: Jan. 28, 2020

(54) DEAD BAND COMPENSATION

(71) Applicant: Texas Instruments Incorporated, Dallas, TX (US)

(72) Inventor: Ramesh Tiruvannamalai Ramamoorthy, Sugar Land, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/392,312

(22) Filed: Apr. 23, 2019

(51) Int. Cl.
*H02M 1/38* (2007.01)
*H02M 7/5387* (2007.01)
*H02P 27/08* (2006.01)

(52) U.S. Cl.
CPC ......... *H02M 1/38* (2013.01); *H02M 7/53871* (2013.01); *H02M 2001/385* (2013.01); *H02P 27/08* (2013.01)

(58) Field of Classification Search
CPC ........ H02M 1/38; H02M 1/42; H02M 3/3376; H02M 3/33507; H02M 3/33523; H02M 7/53806; H02M 7/5387; H02M 7/53871; H02M 7/53875; H02M 2001/0032; H02M 2001/385; H02P 27/08; Y02B 70/1433; Y02B 70/1441
USPC ...................................................... 363/97, 98
See application file for complete search history.

(56) References Cited

U.S. PATENT DOCUMENTS

| | | | | |
|---|---|---|---|---|
| 3,310,758 A | * | 3/1967 | Cottrell | H03K 5/01 332/110 |
| 4,471,280 A | * | 9/1984 | Stack | H02P 7/03 180/446 |
| 5,867,380 A | * | 2/1999 | Lee | H02M 7/53875 363/98 |
| 7,362,152 B2 | * | 4/2008 | Figoli | H03K 7/08 327/172 |
| 2007/0029959 A1 | * | 2/2007 | Ta | B62D 5/046 318/432 |
| 2009/0192634 A1 | * | 7/2009 | Fujinaka | G05B 11/42 700/42 |
| 2014/0160818 A1 | * | 6/2014 | Garces | H02M 7/5395 363/97 |
| 2017/0093313 A1 | * | 3/2017 | Brown | H02P 27/08 |
| 2018/0183363 A1 | * | 6/2018 | Sakamoto | H02P 6/06 |

OTHER PUBLICATIONS

Leggate, David et al., Pulse Based Dead Time Compensator for PWM Voltage Inverters, IEEE Transactions on Industrial Electronics, 1997, vol. 44, No. 2, pp. 191-197.

* cited by examiner

*Primary Examiner* — Yemane Mehari
(74) *Attorney, Agent, or Firm* — Ebby Abraham; Charles A. Brill; Frank D. Cimino

(57) ABSTRACT

A dead band compensation system is provided that provides dead time compensation for a three-phase inverter in connection with counting the time difference between a pulse width without a dead time interval and a pulse width available at the output of the inverter (100). An error measurement is determined, a portion of which is fed back subsequently. Harmonic components, among other things, are reduced, to an extent, in the load current through an inverter load (120). Further, compensation for inverter voltage output errors may be provided.

16 Claims, 4 Drawing Sheets

DEAD BAND COMPENSATION

Three-phase power may be supplied through a direct current (DC) source in connection with three legs of switched devices which are gated with signals. A composite device with sets of gated, switched devices may be referred to as a three-phase inverter. The gated switched devices may include, for instance, pairs of switches such as pairs of silicon-controlled rectifiers (SCRs), pairs of insulated gate bipolar transistors (IGBTs) or pairs of metal-oxide-semiconductor-field-effect-transistors (MOSFETs), with each switch in a pair being turned on and off in a complementary fashion with the other device from the pair. Switches subjected to complementary operation, in a pair, may be referenced as complementary devices or complementary switch devices.

Ideal switches have no conduction loss and no leakage current. Additionally, ideal switches may turn on and off instantaneously. Further, for an ideal switch, there is no energy lost during switching transitions for the switch from "off" to "on" and from "on" to "off." Ideally, complementary operation of switches will result in one switch being turned on simultaneously with its counterpart switch being turned off.

By contrast, practical switches have conduction loss. There may also be significant energy loss during switching transitions. Further, practical switches have finite turn-on and turn-off transition times. Consequently, it will take some time for a switch device to turn on in order to register a digital "high" level (also referenced herein as "high"). Likewise, it will take some time for a switch device to turn off in order to register a digital "low" level (also referenced herein as "low"). Without delaying a gating signal to one of the devices intended for complementary operation, there is a risk of having an instance where both switch devices are turned on—shorting power rails together through the inverter.

Consequently, a short interval of time, referred to as a dead time, is introduced between the time one complementary device in the inverter is turned off and the time a corresponding complimentary device is turned on. The length of the dead time interval is ideally much longer than the worst-case switch device transition time. For example, an insulated-gate bipolar transistor (IGBT) may have a switching transition time which is several hundreds of nanoseconds long. A corresponding dead time interval may include a rise time of a couple of micro seconds with the entire dead time being several micro seconds.

Continuous pulse width modulation (PWM) may be used with three phase inverters for a number of reasons. Continuous PWM may include, for instance, sinusoidal PWM, sine triangle PWM, third harmonic injection PWM and conventional space vector PWM. Inverter dead time affects pole voltage transitions. Pole voltage as used herein refers to the pole of a single pole, double throw switch that each complementary switch device may represent. Every leg may be regarded as the leg of a single pole, double throw switch. The pole voltage refers to the voltage at the midpoint of a leg with respect to an inverter DC post. Consequently, pole voltage transitions will shift, in relation to the value of an ideal switch, on account of dead time. This shift results in what may be considered pole voltage error. This error has a dependence on the direction of the current into the inverter. Dead time also introduces low-frequency harmonic distortion in the inverter output as well as an error in the fundamental output voltage of the inverter.

Because of these errors and effects, a goal of dead time effect compensation is to provide an inverter output as close as possible to the ideal inverter output without dead time.

SUMMARY

Dead band compensation is provided in connection with receiving a first pulse width without dead time; receiving a second pulse width, including dead time, comparing the first pulse width with the second pulse width; determining a pulse width difference between the first pulse width and the second pulse width; counting the pulse width difference between the first pulse width and the second pulse width, the pulse width difference being indicative of an error pulse; and adjusting the next pulse width by the error pulse.

The foregoing, and other features and advantages, will be apparent from the following description, the accompanying drawings, and the claims.

BRIEF DESCRIPTION OF THE DRAWINGS

For a more complete understanding of the present disclosure, the objects and advantages thereof, reference is now made to the ensuing descriptions taken in connection with the accompanying drawings briefly described as follows.

Figure 1:
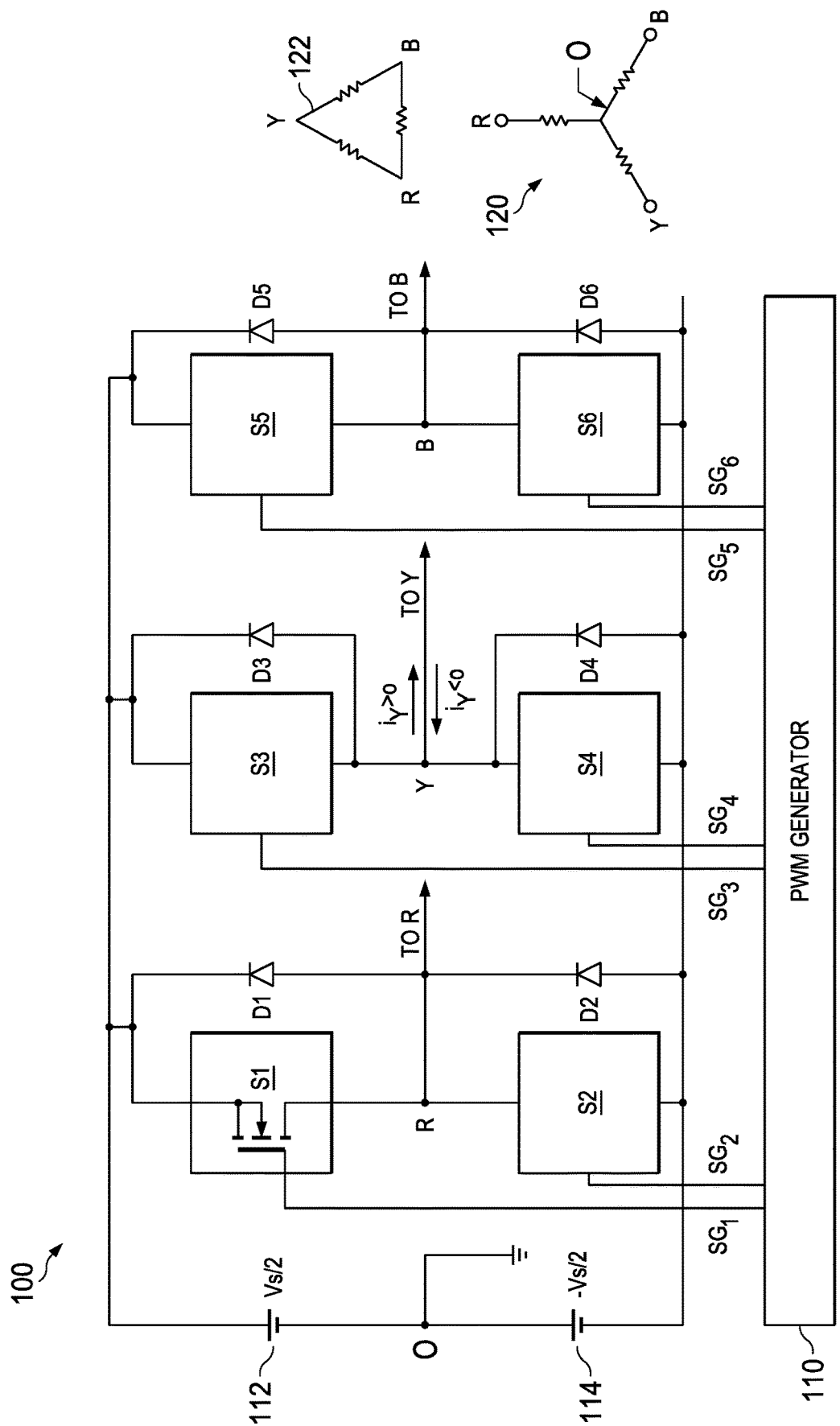
FIG. 1 illustrates a two-level voltage source inverter with gated devices and anti-parallel diodes across each switching device.

Applicable reference numerals have been carried forward.

DETAILED DESCRIPTION

For inverters, such as those discussed herein, the dead time used is ideally much longer than the worst-case device transition time. It is possible to compensate for some of the error by selecting a dead time and corresponding pulse width in order to reduce error in output voltage from the output of a three-phase inverter.

FIG. 1 illustrates a two-level voltage source inverter 100 with gated devices and anti-parallel diode (a diode connected in parallel with a corresponding gated device but with the polarities of the two reversed) across each gated device. The pairs of gated devices, such as pairs of silicon-controlled rectifiers (SCRs), pairs of insulated gate bipolar transistors (IGBTs) or pairs of metal-oxide-semiconductor-field-effect-transistors (MOSFETs) are designated by an indexed S while the anti-parallel diodes are designated by an indexed D. The indexed S devices are gated by a PWM Generator 110. Two voltage sources 112 and 114, shown with a voltage level of $V_s/2$, provide a rail voltage with respect to the DC post O. R, Y and B are mid-point locations between the connection of the complementary devices which are connected in a half-bridge configuration. Pole voltages are defined for each midpoint with respect to the DC post O. S1 and S2, represent one set of complementary devices in one leg of inverter 100. S3 and S4 represent another set of complementary devices on a second leg of inverter 100 and S5 and S6 represent yet another set of complementary devices on a third leg of inverter 100. For three sinusoidal voltages employed for three-phase power, modulated by a carrier signal, there are various schemes that generate PWM pulses to control the various switches in an inverter, while ensuring that two switches intended for complementary operation are not ON at the same time to avoid vertical current shoot-through. Star-connected load 120 from R, Y and B to DC post O, respectively, connects to like terminals of inverter 100. Alternatively, delta-connected load 122 may also connect to inverter 100 in place of star-connected load 120.

Figure 2:
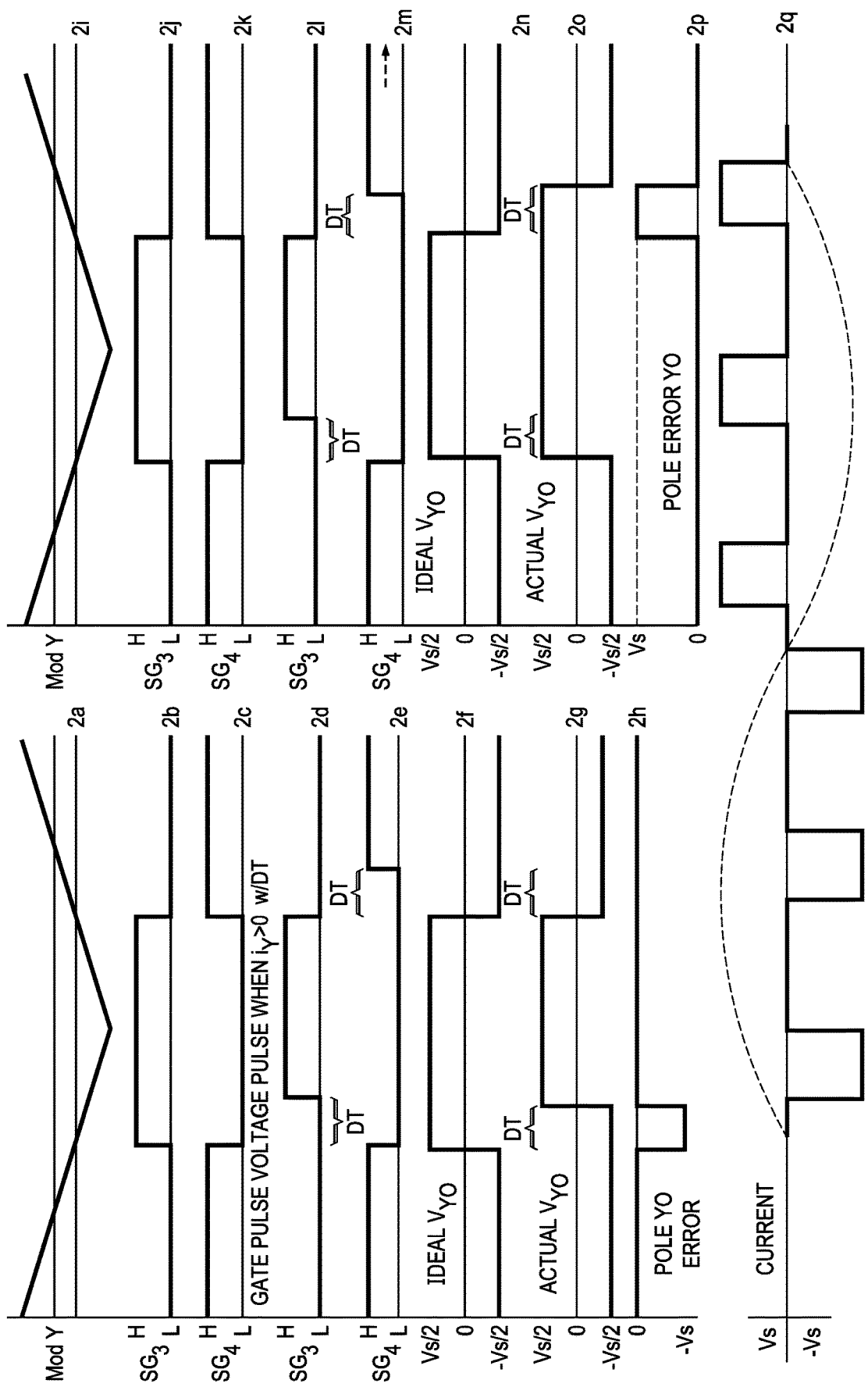
FIG. 2 is a diagram showing voltage transitions pertaining to one cycle of a gate modulating wave and its carrier for one cycle for a case with current $i_y>0$, thus defined as current flowing in a positive direction from node Y.

In order to convey an appreciation of the dead time problems noted herein, reference is made to FIG. 2 which is a diagram showing voltage transitions pertaining to one cycle of a gate modulating wave and its carrier for one cycle for a case with current $i_Y>0$, thus defined as current flowing in a positive direction from node Y of FIG. 1. A gate modulating wave is shown for one carrier-cycle in graph 2a. One cycle of the modulating triangle wave 201 is also shown. Switch operation, for an ideal device, is shown in graph 2b for switch S3's gate signal, $S_{G3}$. Gate signal $S_{G4}$ to Switch S4 (which is S3's complementary switch), for an ideal device, is indicated in graph 2c. Graph 2d illustrates the gate voltage on gate signal $S_{G3}$ for a device operation implemented with dead time. The dead time interval is indicated as DT. Graph 2e illustrates the gate voltage on gate signal $S_{G4}$ for a device operation implemented with dead time. Graph 2f illustrates an ideal pole voltage $V_{YO}$ profile for an ideal device. Graph 2g shows the pole voltage $V_{YO}$ between pole Y and DC post O. $V_{YO}$ transitions between voltages $V_s/2$ and $-V_s/2$. Graph 2h illustrates the negative error (–Vs) as caused by the shift in pole voltage $V_{YO}$ between an ideal device and an actual device. This negative error results in a loss of voltage at the output to star-connected load 120 or at the output to delta-connected load 122 of inverter 100.

Figure 3:
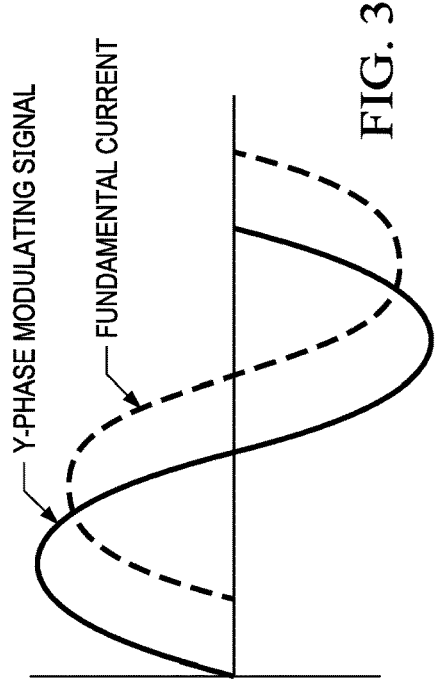
FIG. 3 illustrates a Y-phase modulating signal in relation to its fundamental current (shown as a dashed waveform lagging the modulating signal by about 45°) between the complementary switching devices and a load connected at Y.

As phases are modulated on each leg of the inverter in FIG. 1, FIG. 3 illustrates for the Y leg (the inverter leg having a path through S3 and S4) of FIG. 1, a Y-phase modulating signal in relation to its fundamental current (shown as a dashed waveform lagging the modulating signal by about 45°) between the complementary switching devices (S3 and S4) and a load connected at Y. With reference to FIG. 1, when $i_Y>0$, switch S3 and diode D4 will conduct depending on whether switch S3 has received a gate pulse. When $i_Y<0$, switch S4 and diode D3 will conduct depending on whether switch S4 has received a gate pulse. During the dead time interval, the diode across the complementary switch will conduct. With reference to graph 2d, diode D4 will conduct during time interval DT in connection with both switch S3 and switch S4 not receiving a gate pulse. Because of this diode conduction, the pole voltage for the center leg shifts. The shift in pole voltage will produce a train of negative error pulses, as shown in graph 2q, during a positive half-cycle of the fundamental load current with one pulse in every carrier cycle. These negative error pulses contribute to a loss of voltage at the inverter output.

With reference to FIG. 1 and FIG. 2, for an ideal device, with $i_Y>0$, diode D4 will conduct (D4 on) when gating signal $S_{G3}$ is low and switch S3 will conduct when gating signal $S_{G3}$ is high. As shown by graphs 2b and 2c, no dead time is employed. However, as shown by graphs 2d and 2e, in relation to gating signal $S_{G3}$ to switch S3, and in relation to gating signal $S_{G4}$ to switch S4, dead time is employed for switching gating signal $S_{G3}$ from low to high and for switching gating signal $S_{G4}$ from low to high. Diode D4 continues to conduct during the dead time interval in connection with switching gating signal $S_{G4}$ from high to low. Diode D4 also continues to conduct when switching gating signal $S_{G3}$ from high to low. Consequently, even though gating signal $S_{G4}$ is delayed by dead time DT before being switched to a high level, such does not result in a shift in the pole voltage for this instance ($S_{G4}$ from high to low) of dead time delay.

With reference to graphs 2i and 2q in connection with $i_Y<0$, for an ideal device, over a half wave cycle (modulated by a triangle carrier wave), gating signal $S_{G3}$ is high while gating signal $S_{G4}$ is low and vice versa. Graphs 2j and 2k show ideal gating signals $S_{G4}$ and $S_{G3}$ without a dead band. For an actual device, a delay DT precedes a change in gating signal voltage transitioning from low to high as can be seen in graphs 2l and 2m. With reference to graphs 2l and 2m, transistor S4 stays on until gating signal $S_{G4}$ drops from logic high to logic low, at which time diode D3 turns on. Diode D3 remains turned on through the time period during which both gating signals $S_{G3}$ and $S_{G4}$ remain low until such time gating signal $S_{G4}$ transitions from low to high. As such, the actual pole voltage $V_{YO}$, as shown in FIG. 2o and its width is extended by DT. Graph 2p illustrates the positive error (Vs) as caused by the shift in pole voltage $V_{YO}$ between an ideal device and an actual device. In fact, a train of positive error pulses, as shown in graph 2q, is produced during a negative half cycle of the fundamental load current with one pulse in every carrier cycle. These positive error pulses contribute to a gain of voltage at the inverter output.

Because of the noted errors and effects, a goal of dead time effect compensation is to provide an inverter output as close as possible to the ideal inverter output without dead time. Therefore, a need exists to compensate for the error associated with dead time and for providing dead band compensation.

Figure 4:
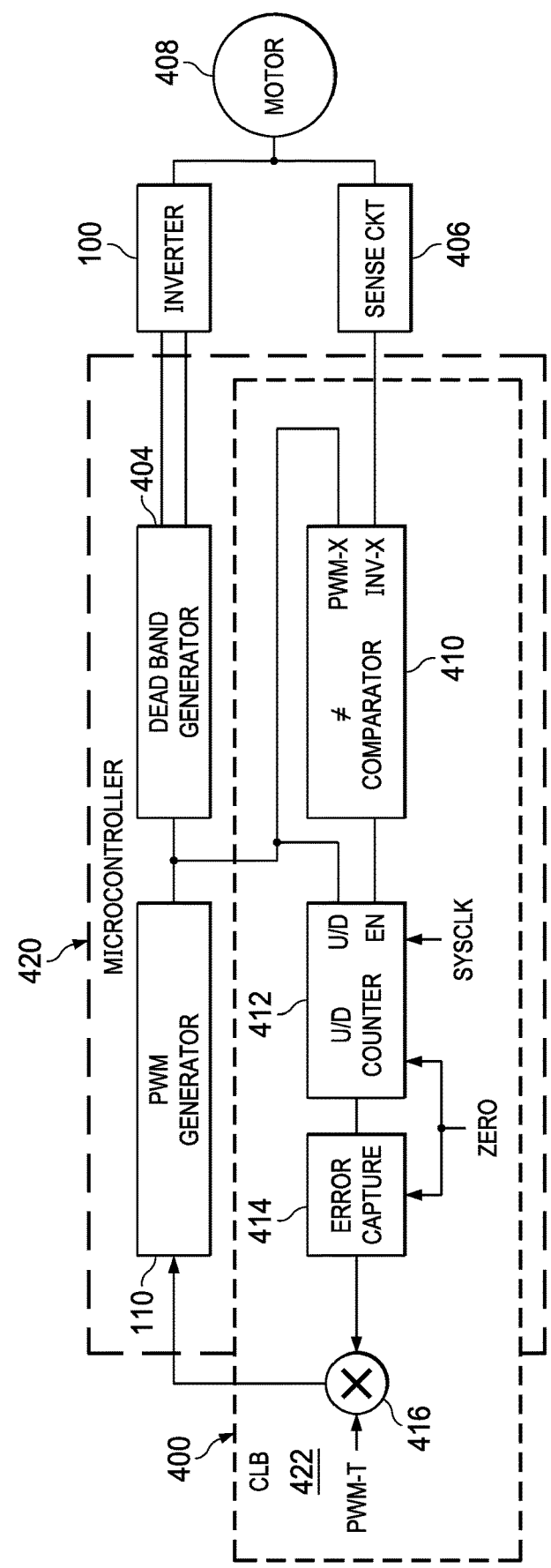
FIG. 4 illustrates a diagram of a dead band compensation system for compensating errors in a three-phase inverter.

FIG. 4 illustrates a diagram of a dead band compensation system 400 which may be used to compensate for the foregoing described errors. The system of FIG. 4 may be implemented using digital circuits or combinations of digital and analog circuits. For instance, the two-level inverter 100 may be implemented using silicon-controlled rectifiers (SCRs), insulated gate bipolar transistors (IGBTs) or metal-oxide-semiconductor-field-effect-transistors (MOSFETs). Additionally, comparator 410 may include analog or digital circuitry to compare pulse widths.

Pulse width modulator (PWM) generator 110 is coupled to dead band generator 404 which provides complementary dead time inserted gate pulses to a two-level inverter 100. The output of inverter 100 is coupled to sense circuit 406. Comparator 410 receives the output from sense circuit 406 and PWM generator 110. Up/Down (U/D) counter 412 receives a signal, controlling its enablement (EN), from the output from comparator 410. U/D counter 412 provides its output to error capture device 414. Error capture device 414 provides an output to summer 416.

A signal without dead band adjustment is sent from PWM generator 110 to one input PWM-X of comparator 410. This signal may be considered as being representative of an ideal gating signal as discussed above. Another signal from sense circuit 406 is received at a second input INV-X of comparator 410. Comparator 410 sends a signal to enablement input EN of U/D counter 412 in connection with signals at PXM-X and INV-X being unequal. In connection with system clock SYSCLK and a pulse to U/D counter 412, error pulses may be counted over a period of one carrier cycle. As such, the pulse width of a signal from the output of PWM generator 110 and the pulse width of a signal from the sense circuit 406, representing the corresponding phase output signal of the inverter, are digitally compared by comparator 410, in connection with enabling U/D counter 412 to count the pulse width corresponding to the pulse width error. The pulse width corresponding to the pulse width error is determined by incrementing or decrementing a counter during each clock pulse of system clock SYCLK during the interval of time when INV-X and PWM-X are not equal. The pulse width error is representative of the error between the two signals. The pulse width count is stored in error capture device 414 and this error is fed back as a first summand input to summer 416 which sends the pulse width error back to PWM generator 110 along with the input signal, such as the modulating carrier, PWM-T, which serves as a second summand input to summer 416. In this manner, a corrective pulse may be added to PWM generator with input signal PWM-T to correct the pulse width error. The correction applied to PWM generator 110 compensates the dead time administered by dead band generator 404 so as to result in an appropriate inverter output voltage and in a reduction in phase current distortion due to harmonic mitigation. In some examples, microcontroller 420 may be used to identify the pulse width error, using digital logic, which may apply the pulse width correction. Microcontroller 420 may be programmed to control dead band compensation system 400. Microcontroller 420 may be coupled to various system components such as PWM generator 110, dead band generator 404 and inverter 100. In some examples, dead band compensation system 400 may be included in a package containing microcontroller 420. Such a microcontroller may be used for closed-loop control applications such as industrial motor drives; solar inverters and digital power; electrical vehicles and transportation; and sensing and signal processing. In other examples, dead band compensation system 400 is included in the configurable logic block (CLB) 422 of microcontroller 420. CLB 422 provides interfacing and control features for microcontroller 420. CLB 422 includes interconnected logic modules. CLB 422 is capable of providing a flexible customizable logic of small scale, and it can help connect with various input/output of various peripherals on a device to get a desired target function. CLB 422 may include a position manager, or other functionality that would otherwise be accomplished using additional logic devices. CLB 422 may also be used in conjunction with other on-chip resources within microcontroller 420 to perform more complex functionality.

Figure 5:
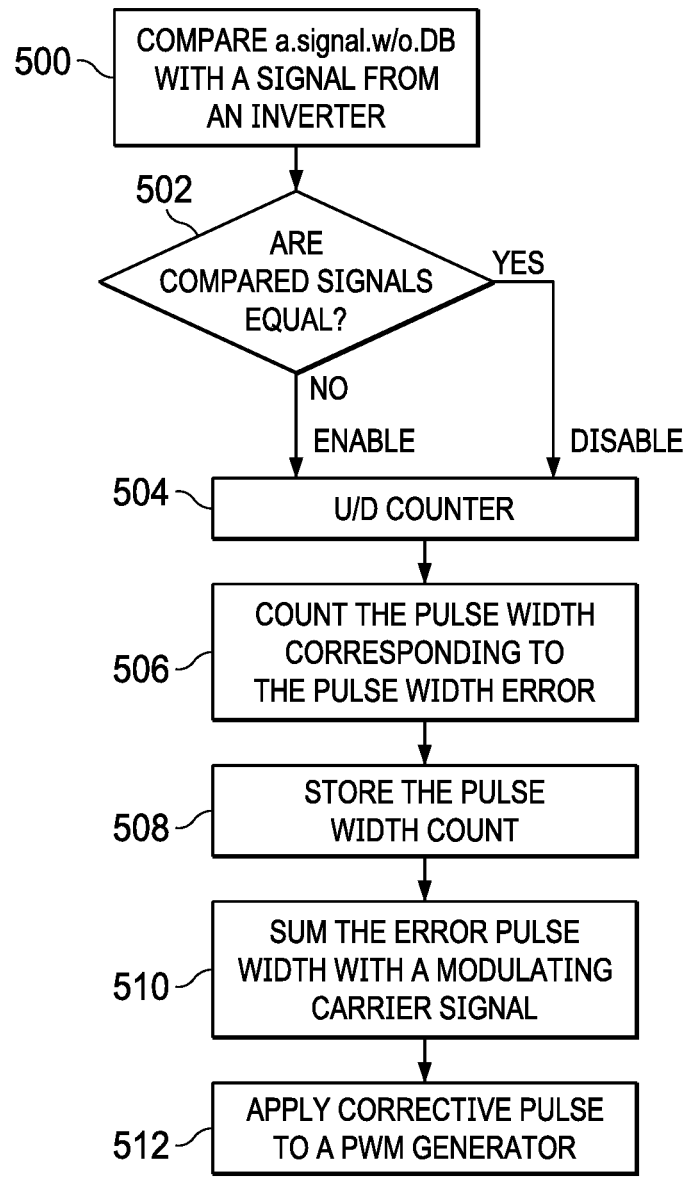
FIG. 5 illustrates a flowchart detailing the foregoing operation of the dead band compensation system shown in FIG. 4.

FIG. 5 illustrates a signal flow diagram detailing the foregoing operation of the dead band compensation system shown in FIG. 4. FIG. 5 summarizes the operation of the dead band compensation system 400 of FIG. 4. At step 500, a comparison is made of a signal without deadband for phase Y with a sensed signal representing phase Y from a three phase inverter. At step 502 a determination is made as to whether the compared signals are equal. If the signals are not equal, an up/down counter is enabled in step 504, or else disabled. The pulse width corresponding to the pulse width error is determined by incrementing or decrementing a counter in step 506. The error pulse width count is stored at step 508. The error pulse width is summed with the modulating carrier signal in step 510. Finally, a corrective pulse is applied to a pulse width modulator generator at step 512.

Although the foregoing description has been presented with an emphasis on the phase Y and the YO pole, a similar description may be applied to the remaining inverter phases such as the R phase and B phase and the RO and BO poles.

The system of the examples presented or portions of the system thereof may be in the form of a "processing machine," such as a general-purpose computer, special purpose processor or microcontroller, for example. As used herein, the term "processing machine" may be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

The processing machine described above may also use a wide variety of other technologies including a special purpose computer, a computer system including, for example, a microcomputer, mini-computer, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device ("PLD") such as a Field-Programmable Gate Array ("FPGA"), Programmable Logic Array ("PLA"), or Programmable Array Logic ("PAL"), or any other device or arrangement of devices that is capable of implementing the steps of the processes described The processing machine used to implement the foregoing may utilize a suitable operating system.

Further, various technologies may be used to provide communication between the various processors and/or memories, as well as to allow the processors and/or the memories to communicate with any other entity, i.e., so as to obtain further instructions or to access and use remote memory stores, for example.

As described above, a set of instructions may be used in the processing of the foregoing. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the foregoing may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various examples of the foregoing Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the foregoing. Rather, any number of different programming languages may be utilized as is necessary and/or desirable.

Also, the instructions and/or data used in the practice of the examples may utilize any compression or encryption technique or algorithm, as may be desired. An encryption module might be used to encrypt data. Further, files or other data may be decrypted using a suitable decryption module, for example.

Further, the memory or memories used in the processing machine that implement the foregoing may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

The foregoing has been described herein using specific examples for the purposes of illustration only. It will be readily apparent to one of ordinary skill in the art, however, that the principles of the foregoing can be embodied in other ways. Therefore, the foregoing should not be regarded as being limited in scope to the specific examples disclosed herein, but instead as being fully commensurate in scope with the following claims.

I claim:

1. A system comprising:
   a pulse width modulator (PWM) generator having an input and an output;
   a dead band generator having an input coupled to the output of the PWM generator, the dead band generator further having a first output and a second output for an associated phase;
   an inverter having an output, a first input and a second input, the first input of the inverter being coupled to a first output of the dead band generator and the second input of the inverter being coupled to a second output of the dead band generator;
   a sense circuit having an output and an input coupled to the output of the inverter;
   a comparator having an output, a first input and a second input, the first input of the comparator being coupled to the output of the PWM generator and the second input of the comparator being coupled to the output of the sense circuit;
   an up/down counter, having an output, an enable input, and an up/down control input, the up/down control input being coupled to the output of the PWM generator, the enable input being coupled to the output of the comparator;
   an error capture device having an input and an output, the input of the error capture device being connected to the output of the up/down counter; and
   a summer, the summer having an output, a first summand input, and a second summand input, the first summand input being the modulated signal representing a desired pulse width and the second summand input being coupled to the output of the error capture device.

2. The system as recited in claim 1 wherein the inverter is a three-phase inverter.

3. The system as recited in claim 1 wherein the inverter comprises pairs of devices connected in a half-bridge configuration.

4. The system as recited in claim 3 wherein devices of the pairs of devices are selected from the group consisting of a semiconductor-controlled rectifiers (SCR), an insulated gate bipolar transistor (IGBT), a metal-oxide-semiconductor-field-effect-transistor (MOSFET) and semiconductor switch.

5. The system of claim 1 further comprising a three-phase load, in a star or delta configuration, coupled to the inverter.

6. A method comprising:
   receiving a first signal with a first pulse width;
   receiving a second signal with a second pulse width, wherein the second signal is delayed by a dead time;
   comparing the first pulse width with the second pulse width;
   determining a pulse width difference between the first pulse width and the second pulse width, the pulse width difference being indicative of an error pulse; and
   adjusting the first pulse width by a portion of the error pulse during a subsequent pulse width modulation (PWM) cycle.

7. The method as recited in claim 6, wherein the first signal is a signal of a desired pulse width.

8. A microcontroller including a configurable logic block wherein the configurable logic block comprises:
   a comparator having an output, a first input and a second input, the first input of the comparator being coupled to the output of the PWM generator and the second input of the comparator being coupled to the output of the sense circuit;
   an up/down counter, having an output, an enable input, and a up/down count mode input, the up/down count mode input being coupled to the output of the PWM generator, the enable input being coupled to the output of the comparator; and
   an error capture device having an input and an output, the input of the error capture device being connected to the output of the up/down counter.

9. A computer-readable, non-transitory, programmable product, comprising code, executable by a microcontroller, for causing a microcontroller to do the following:
   send a pulse width count to a pulse width modulation (PWM) generator;
   set a dead band time interval;
   cause a pulse width modulator generator to send a first signal with a first pulse width;
   cause a dead band generator to:
      adjust two complementary signals by the dead band time interval; and
      send the two adjusted complementary signals;
   cause an inverter to receive the two adjusted complementary signals;
   sense a second pulse width representing the output of the inverter;
   compare the first pulse width with the second pulse width;
   determine the pulse width difference between the first pulse width and the second pulse width, the pulse width difference being indicative of an error pulse; and adjusting the first pulse width by at least a portion of the pulse width difference to for a subsequent cycle.

10. The computer-readable, non-transitory, programmable product as recited in claim 9 wherein the code further causes the PWM generator to generate a continuous pulse width modulation signal.

11. The computer-readable, non-transitory, programmable product as recited in claim 9 wherein the code causes:
the microcontroller to select the continuous pulse width modulating signal based in part on a signal based off sinusoidal PWM, a signal based off of a third harmonic injection PWM signal, a signal based off of a space vector PWM signal, or a signal resulting from a scheme that calculates a pulse width count to drive the PWM generator; and
the PWM generator to generate a continuous pulse width modulating signal.

12. A computer-readable, non-transitory, programmable product, comprising code, executable by a microcontroller, for causing a microcontroller to do the following:
send a modulating signal representing a first pulse width to a pulse width modulating generator;
set a dead band time interval;
cause a dead band generator to:
    adjust two complementary signals by the dead band time interval; and
    send the two adjusted complementary signals;
cause an inverter to receive the two adjusted complementary signals;
sense a second pulse width representing the output of the inverter;
cause the comparison of the first pulse width with the second pulse width;
determine of the pulse width difference between the first pulse width and the second pulse width, the pulse width difference being indicative of an error pulse; and
adjust a modulating carrier input signal by at least a portion of the error pulse.

13. The computer-readable, non-transitory, programmable product as recited in claim 12 wherein the modulating carrier input signal is a modulating triangle wave.

14. The computer-readable, non-transitory, programmable product as recited in claim 12 wherein the code further causes the pulse width modulating generator to generate a continuous pulse width modulation signal.

15. The computer-readable, non-transitory, programmable product as recited in claim 14 wherein the continuous pulse width modulating signal is selected from the group consisting of a sinusoidal PWM signal, a sine triangle PWM signal, a third harmonic injection PWM signal and a conventional space vector PWM signal or any custom PWM signal.

16. A system comprising:
a pulse width modulator (PWM) generator having an input and an output;
a dead band generator having an input coupled to the output of the PWM generator, the dead band generator further having a first output and a second output for each associated phase therewith;
a comparator having an output, a first input and a second input, the first input of the comparator being coupled to the output of the PWM generator and the second input of the comparator for receiving output from a sense circuit for sensing the corresponding phase voltage;
an up/down counter, having an output, an enable input, and an up/down control input, the up/down control input being coupled to the output of the PWM generator, the enable input being coupled to the output of the comparator;
an error capture device having an input and an output, the input of the error capture device being connected to the output of the up/down counter; and
a summer, the summer having an output, a first summand input, and a second summand input, the first summand input being the modulated signal representing the desired pulse width and the second summand input being coupled to the output of the error capture device.

* * * * *